W. A. FREDERICK.
STEERING AID ATTACHMENT FOR MOTOR VEHICLES.
APPLICATION FILED JULY 13, 1915.
1,212,160.
Patented Jan. 9, 1917.
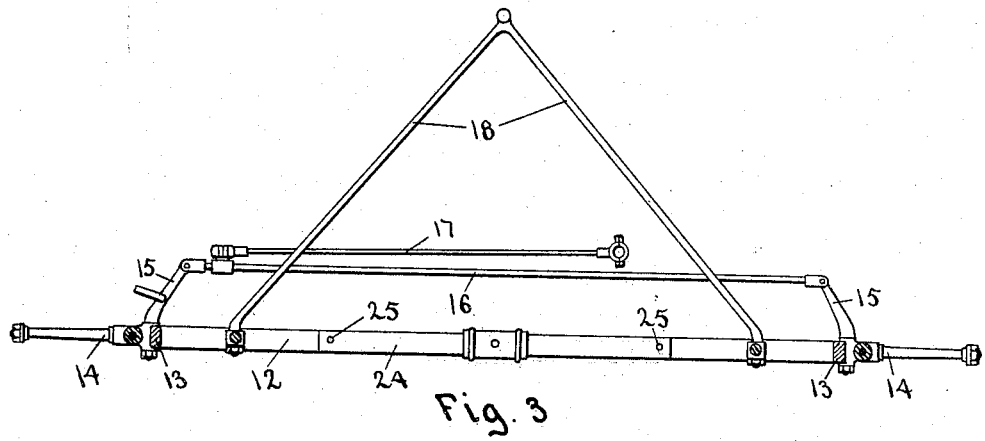
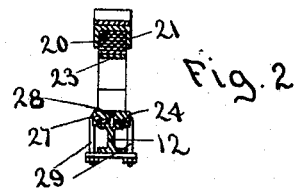
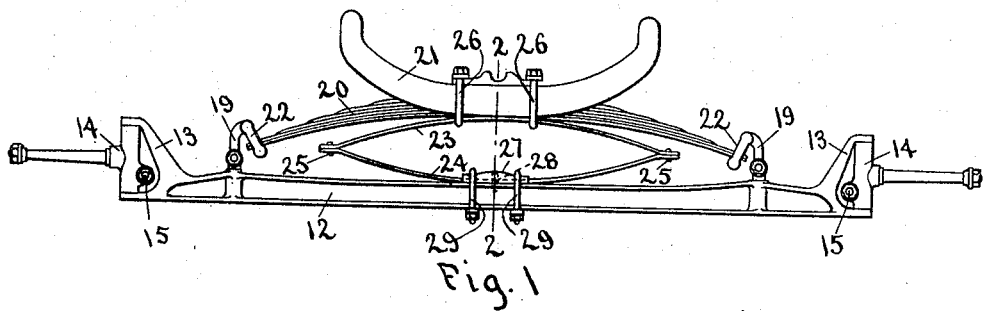
Inventor
William A. Frederick
by ⟨signature⟩
Att'y

UNITED STATES PATENT OFFICE.

WILLIAM A. FREDERICK, OF BOSTON, MASSACHUSETTS, ASSIGNOR TO TWIN-RIM COMPANY, OF BOSTON, MASSACHUSETTS, A CORPORATION OF MASSACHUSETTS.

STEERING-AID ATTACHMENT FOR MOTOR-VEHICLES.

1,212,160.  Specification of Letters Patent.  Patented Jan. 9, 1917.

Application filed July 13, 1915. Serial No. 39,588.

*To all whom it may concern:*

Be it known that I, WILLIAM A. FREDERICK, of Boston, in the county of Suffolk and State of Massachusetts, have invented certain new and useful Improvements in Steering-Aid Attachments for Motor-Vehicles, of which the following is a specification.

This invention relates to motor vehicles or automobiles, and refers particularly to the front axle structure and support or connections of a Ford car.

Ford cars and also some other automobiles or motor vehicles are not readily steered accurately owing to the fact that the body of the car which supports or carries the steering post and wheel is liable to have more or less lateral movement relatively to the front wheels, or in other words, in the direction of the length of the front axle. Since the steering wheels are carried by the front axle, connections between the parts of the steering mechanism carried by the body of the car, and those parts which are carried by the front axle, cause the front wheels to sometimes "wabble," especially when traveling rapidly or over a rough road.

The object of my invention is to improve the steering qualities of a motor vehicle such as a Ford car, by not only preventing lateral movement of the front portion of the body or chassis relatively to the steering wheel and front axle, but to also reduce the amount of vertical movement which the front axle and body may have relatively to each other. My improvements stiffen the connections to reduce the amount of lateral movement and also vertical movement, and to a lesser degree, to stiffen the connections against relative movement forward or back. My said improvements also improve the appearance of the front of the car. In reducing the amount of vertical movement of the front portion of the body of the car and the front axle relatively to each other, my improvements act as a "snubber" or shock absorber.

With the above objects in view my invention consists in the improvements which I shall now proceed to describe and claim.

Of the accompanying drawings, Figure 1 is a front elevation of my improvements, and of enough portions of the front of a Ford car to enable my invention to be understood. Fig. 2 represents a section on line 2—2 of Fig. 1. Fig. 3 represents a plan view, partly in section.

Similar reference characters indicate similar parts in all of the views.

The front axle 12 is formed with yokes or brackets 13 in which are mounted the bodies 14 of the spindles for the front or steering wheels. Said bodies have arms 15 connected by a rod 16, a rod 17 being connected to the rod 16 at one end and having its other end formed to be connected to the operating parts of the steering mechanism carried by the body of the car. These parts are as usual in Ford cars. The angular radius rod 18, the perches 19 for the front supporting spring 20 which is connected at its midlength to the frame or chassis 21 and at its ends connected by links 22 to the perches 19 are also as usual in Ford cars.

My steadying device and the snubber consists of an elliptic spring interposed between the axle and the supporting spring 20, but said elliptic spring does not act in any sense as a supporting spring, but just the reverse, to act in opposition to the spring 20. Said elliptic spring consists of upper and lower members 23, 24, respectively which preferably consist of spring strips so formed and tempered as to have a tendency, if free, to assume a straight or nearly straight line. The two members are connected together at their ends by any suitable means such as rivets 25. The intermediate or midlength portion of the upper member 23 is secured to the chassis 21 by suitable means such as clips 26. The intermediate or midlength portion of the lower member 24 preferably has a shoe 27 bearing upon its upper surface and steadied in position by a pin or bolt 28, clips 29 being employed to bind the shoe and the lower member tightly to the axle 12. This structure as described is such that a pulling action is exerted tending to draw the front axle and the front of the chassis toward each other, the two members 23 and 24 being held apart by the supporting spring 20. This results in the device acting as a snubber to prevent undue rebounding action. At the same time, the portions of the members 23, 24, on opposite sides of their midlength, act as spring toggles so as to oppose, by a lateral thrust, tendency of the front of the chassis to move laterally or tendency of the front axle to move in the direction of its length, although at the same time, however, freedom of movement is permitted to enable the spring 20 to perform its functions.

I claim:

1. The combination with the front axle, chassis, and front supporting spring of a motor vehicle, the said axle having swinging wheel-carrying members at its ends, and steering connections with said members, of a spring toggle interposed between the said axle and supporting spring, and rigidly connected to said axle and supporting spring to prevent lateral movement of said members relatively to each other, said spring toggle having a constant tendency to collapse and pull the said axle and chassis toward each other.

2. In a motor-vehicle, the combination with the front axle and yieldingly-supported chassis, the said axle having swinging wheel-carrying members at its ends, and steering connections with said members, of means for opposing lateral movement of the chassis relatively to said axle and also exerting a yielding pull of the chassis and axle toward each other, said means comprising a pair of spring strips having a constant normal tendency to assume a substantially straight line, said strips being rigidly connected together at their ends and having intermediate portions rigidly secured to the chassis and axle respectively, whereby said strips constantly tend to pull the chassis and axle toward each other.

In testimony whereof I have affixed my signature.

WILLIAM A. FREDERICK.

Copies of this patent may be obtained for five cents each, by addressing the "Commissioner of Patents, Washington, D C."